United States Patent [19]
Hill et al.

[11] Patent Number: 5,642,416
[45] Date of Patent: Jun. 24, 1997

[54] AM BROADCAST BAND INTERFERENCE FILTER FOR LINE-POWERED TELEPHONE

[75] Inventors: Ralph Leon Hill, Pepperell, Mass.; Noel C. Pratt, Van Nuys, Calif.

[73] Assignee: Harris Corporation, Melbourne, Fla.

[21] Appl. No.: 399,355

[22] Filed: Mar. 3, 1995

[51] Int. Cl.[6] .................. H04M 1/74; H04B 1/10
[52] U.S. Cl. ............. 379/416; 379/399; 379/414; 379/412; 379/429; 455/296
[58] Field of Search .................. 455/300, 301, 455/296; 379/416, 415, 417, 414, 412, 429, 399; 178/63 E; 381/189

[56] References Cited

U.S. PATENT DOCUMENTS

| | | | |
|---|---|---|---|
| 1,949,996 | 3/1934 | Fleming | 333/181 |
| 2,136,659 | 11/1938 | Wood | 455/300 X |
| 4,738,638 | 4/1988 | Bogese, II | 439/610 |
| 4,876,713 | 10/1989 | Crosby et al. | 379/412 |
| 5,073,924 | 12/1991 | Frisby | 379/416 X |
| 5,271,056 | 12/1993 | Pesola et al. | 379/58 |
| 5,490,030 | 2/1996 | Taylor et al. | 361/45 |
| 5,557,653 | 9/1996 | Paterson et al. | 379/58 |

*Primary Examiner*—Krista M. Zele
*Assistant Examiner*—Devendra T. Kumar
*Attorney, Agent, or Firm*—Charles E. Wands

[57] ABSTRACT

An electromagnetic interference by-pass filtering mechanism suppresses RF noise currents conducted over the tip and ring leads of a telephone line-powered telephone instrument. Such RF noise currents may result from amplitude modulated radio broadcast signals emanating in the vicinity of the telephone instrument. The filtering mechanism comprises a conductive material coated on the interior surface of the housing of the telephone instrument, so as to surround the printed circuit board containing the telephone circuitry of the instrument. The conductive material is coupled to earth. First and second capacitors are coupled between the tip and ring leads and the conductive material, and first and second inductors are coupled in series with the tip and ring conductors and connections of the tip and ring conductors to the printed circuit board containing the telephone circuitry.

19 Claims, 1 Drawing Sheet

5,642,416

AM BROADCAST BAND INTERFERENCE FILTER FOR LINE-POWERED TELEPHONE

FIELD OF THE INVENTION

The present invention relates in general to communication systems and devices, and is particularly directed to a mechanism installable in a telephone line-powered telephone instrument for suppressing AM broadcast band (typically defined from 540 Khz to 1800 KHz) electromagnetic interference (EMI) that is conducted along wires into a telephone line-powered telephone instrument.

BACKGROUND OF THE INVENTION

Electromagnetic interference (EMI), which involves the undesired coupling of electromagnetic energy from an electromagnetic energy source to an affected circuit, system, or structure, may be coupled from the source in one of four ways: 1- through conduction along wires; 2- by far field radiation, such as occurs between a transmitting antenna and a receiving antenna separated by approximately one or more wavelengths of the interference frequency; 3- through capacitive (electric field) coupling; and 4- through inductive (magnetic field) coupling.

One example of the EMI problem involves the widespread use of digital computer circuits in automobile control systems. Such circuits are vulnerable to EMI from radio frequency transmitters such as cellular telephones and amateur radio ("ham") transmitters. In order to function properly, the electronic engine and braking system computers within an automobile must be designed to be relatively immune to the influence of the electromagnetic fields generated by such nearby transmitters.

Similarly, telephone instruments, such as ruggedized test telephones, are often used in an environment that includes one or more nearby AM broadcast radio stations having high power radio frequency transmitters and associated antenna systems, and are therefore subject to exposure to electromagnetic energy that may be sufficient to interfere with or completely disable the operation of such an instrument. Field experience of the present inventors has shown that interference to telephones caused by AM radio broadcasts results mainly from radiated RF signals that are coupled into nearby telephones transmission lines and are then conducted as RF currents into telephones connected to the affected transmission lines.

Because most present day telephone designs employ active circuits (amplifiers, automatic gain control circuits, etc.), which provide telephones with certain advantages over the older "passive" designs, they have greater susceptibility to interference caused by unwanted RF currents. This is due to the nature of the active circuitry which has the undesired capability of readily demodulating audio from amplitude modulated RF carriers.

Field experience in the vicinity of AM radio stations has shown that interference to the desired operation of a telephone instrument is manifested in two primary ways: 1- the telephone's electronic circuits demodulate the audio signal component of amplitude modulated RF currents, amplify this unwanted audio signal component, and couple it to the telephone's receiver, thereby making it extremely difficult or effectively impossible to understand intended received speech; and 2- if the RF signal strength is high enough, the internal circuitry of the telephone instrument will be disabled, making it impossible to place a call.

This problem is diagrammatically illustrated in FIG. 1, which shows a circuit equivalent of high powered, commercial, radio broadcast antenna, transmitting RF signals into a two wire, metallic, telephone transmission line located in the vicinity of the antenna transmitter site. The unwanted AM broadcast signal is schematically represented by a noise source 11 having an associated noise source impedance 13. The AM signal is injected through a pair of resistors 15 and 17, that represent a balanced two-wire transmission line 20, to tip and ring connectors 21 and 22 of a telephone set 30. The hardware of telephone set 30 typically includes a printed circuit board 31, housed within an insulating (plastic) housing or case 33. Mounted on printed circuit board 31 are one or more active electronic circuits, which are capacitively coupled to earth by a naturally occurring mutual capacitance CMO. The undesired RF currents are conducted over the two wire (tip and ring) transmission line 20 in common mode fashion.

RF noise tests conducted in the field have revealed that the strength of the RF noise signal, which follows the dotted line path 25 (from the source 11—through tip and ring transmission line 20—the amplifier circuitry of printed circuit board 31—mutual capacitance CMO-to-earth) is high enough to cause interference to the telephone instrument for blocks around the perimeter of an AM radio broadcast facility.

Presently, in the United States, there are no mandatory regulations requiring manufacturers to provide RF immunity in telephone sets. Although the FCC does not regulate RF susceptibility in telephone equipment, it is aware that RFI in telephones is a problem. In 1994, the FCC published the results of an informal field survey on RF interference to telephones in which several field offices tested the susceptibility of various types of telephones at over a hundred locations of reported RFI. In its report, the FCC describes using a "bulletproof" telephone, having a passive design (which is inherently more immune to RF currents than designs employing active circuits, as noted above) that employs LC filtering to reduce RFI.

On the other hand, there are already several European countries that require compliance of telephone equipment with RF immunity specifications. European specifications require that compliance be demonstrated by laboratory testing. There are two consequences of this that will affect the nature of RF filter designs. First, laboratory conditions do not necessarily duplicate the conditions in the field; secondly, specified test levels are considerably lower than those experienced in the field, especially when the telephone is in close proximity to high powered broadcast facilities. Thus solutions to RFI which work in a lab at relatively low test levels will likely be different than those which successfully operate in a practical or 'real world' environment.

In addition, in Mexico, Telephonos de Mexico (TelMex) has a requirement that telephones must have RF Immunity. To date the present inventors have not experienced the use of any telephones in Mexico that completely suppresses RFI. Either or both of the fundamental problems described above are typical, AM audio signals are demodulated or the telephone's electronic circuitry is affected (e.g., dialing circuitry disabled by conducted RF current).

Although various shielding/grounding schemes, such as those described in the U.S. Patents to Pesola et al, No. 5,271,056 and Bogese, No. 4,738,638, address the EMI problem in general, neither patent describes the above-referenced problem of unwanted demodulation by the telephone's electronic circuitry of AM broadcast signals as undesired common mode RF currents on the two wire (tip and ring) conductors. The Pesola et al patent describes the use of a ground foil with a raised edge of frame plate for components of a radio telephone. The Bogese patent describes the replacement of one of the conductors of a telephone type modular jack with a ground strap having a wide surface for conducting high frequency EMI signals to ground, or a metallic connector cover provided for the purpose.

SUMMARY OF THE INVENTION

The present invention is directed to a mechanism that effectively eliminates interference caused by high level, amplitude modulated, radio broadcasts, in particular, to the elimination of radio frequency interference (RFI) resulting from amplitude modulated, conducted, RF noise currents on the tip and ring conductors to a telephone set's active circuits. As will be described, the invention is operative to filter out conducted AM radio current signals such that the filtered telephone can perform its expected operations, there is no interference with conversation, and there is no degradation of conventional telephone performance parameters.

For this purpose, the invention involves modifying a conventional telephone set to include a conductive coating applied to the interior surface of its insulating case. In addition, coupled between the tip and ring conductors and the conductive coating of the case are first and second auxiliary capacitors, while first and second inductors are coupled in series with the tip and ring conductors and their connections to the printed circuit board.

Each of the auxiliary capacitors has a value that is considerably larger than the value of mutual capacitance between conductive traces on printed circuit board and the conductive coating on the interior of the telephone's case. The effective impedance to earth seen by common mode RF noise current signals on the tip and ring leads is therefore far lower than that encountered in a path through the circuitry on the printed circuit board. Although this effectively increases the common mode current injected into the telephone, the lower impedance of the by-pass path through the auxiliary capacitors steers the common mode RF current around the printed circuit board, rather than through its active circuitry.

The values of the auxiliary capacitors must be sufficiently small to prevent reduction of the AC impedance that the telephone presents to the telephone network, when it is off hook. It has been found that each of the auxiliary capacitors may have a value on the order of 0.02 uf or less. When looking into the telephone circuit across the tip and ring leads, the auxiliary capacitors are in series with each other and establish a capacitance on the order of 0.01 uf across tip and ring, which is in parallel with the impedance of the telephone set. Capacitor values considerably larger than 0.02 uf may reduce the AC impedance of the telephone set to below the required 600 to 900 ohm range, which must be maintained over the 300 to 3400 Hz speech band. Although increasing the values of the pair of auxiliary tip and ring capacitors to values larger than 0.02 uf further reduces the level of demodulated audio, doing so would compromise the effective AC impedance.

The inductors present a high series impedance to the RF noise signals and thereby further reduces RF current into the telephone's active circuits, so that the level of the demodulated audio noise signal is below human audibility level. This effectively makes the performance of the telephone under test, modified in accordance with the present invention, virtually indistinguishable from telephones connected to transmission lines in which no RF current is flowing.

DETAILED DESCRIPTION

As described briefly above, the RFI filter mechanism of the present invention is operative to effectively eliminate interference caused by high level, amplitude modulated, radio broadcasts, in particular, radio frequency interference (RFI) resulting from amplitude modulated RF noise currents conducted over the tip and ring leads to the active circuitry components of a telephone set, so that there is no degradation of conventional telephone performance parameters.

Figure 1:
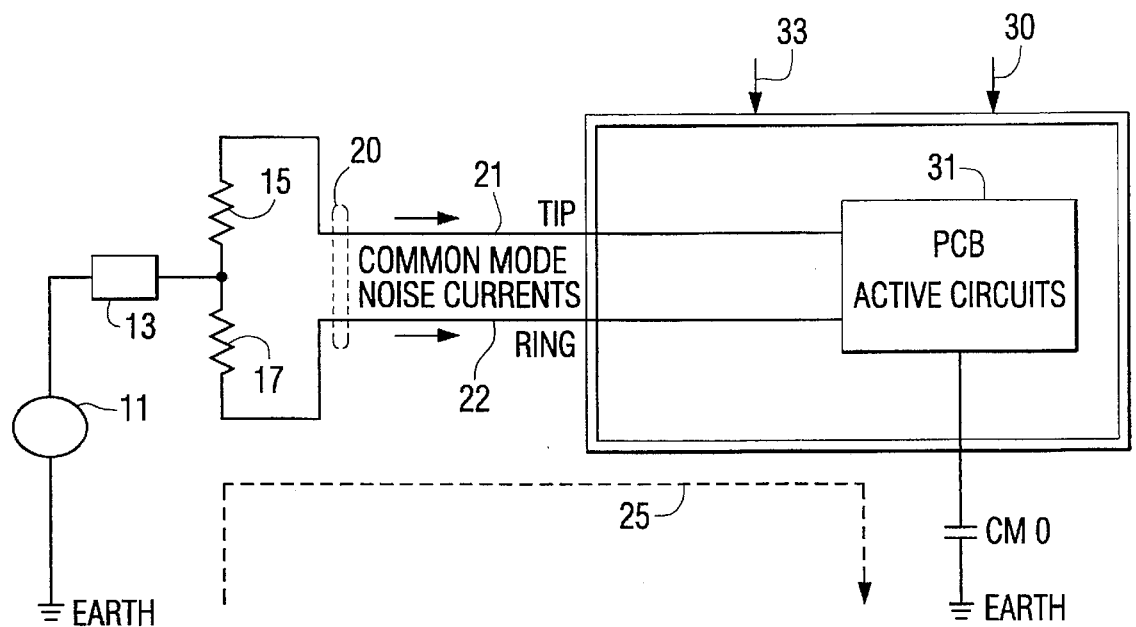
FIG. 1 diagrammatically illustrates a circuit equivalent of high powered, commercial, radio broadcast antenna, transmitting RF signals that are readily picked up by two wire, metallic, telephone transmission lines located in the vicinity of a broadcast antenna site.
Figure 2:
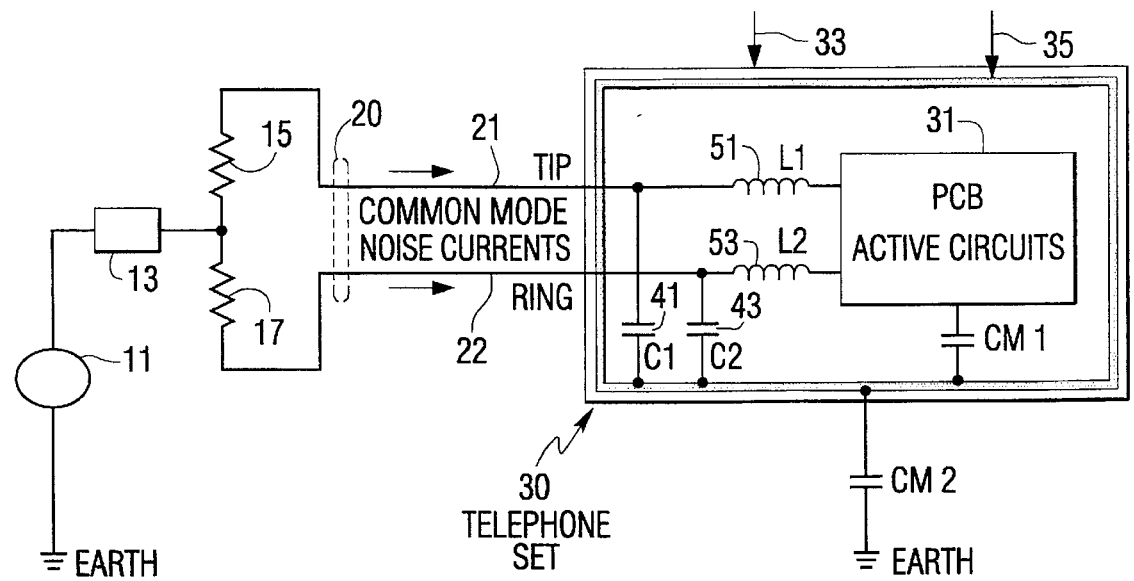
FIG. 2 diagrammatically shows a modification of the configuration of a telephone set to include a conductive coating, auxiliary parallel tip and ring capacitors, and series inductors in accordance with the invention.

The present invention is diagrammatically illustrated in FIG. 2, which shows a modification of the configuration of a telephone set 30 to include a conductive coating 35 applied to the interior surface of its insulating (plastic) housing or case 33. In addition, coupled between the tip and ring conductors 21 and 22 of transmission line 20 and conductive coating 35 are first and second auxiliary capacitors 41 and 43, having respective values C1 and C2. Also, first and second auxiliary inductors 51 and 53 (having respective values L1 and L2 of approximately 1 mH each) are coupled in series with the tip and ring conductors 21 and 22 and their connections to printed circuit board 31.

The respective values C1 and C2 of auxiliary capacitors 41 and 43 are considerably larger than the value of mutual capacitance CM1 between conductive traces on printed circuit board 31 and the conductive coating 35 within the telephone set case 33. The mutual capacitance between conductive coating 35 and earth is denoted by CM2. As a result, the effective impedance to earth seen by the common mode RF noise current signals on the tip and ring leads 21 and 22 is far lower than that encountered in a path through the circuitry on the printed circuit board 31.

Although the conductive coating and LC by-pass arrangement of the present invention may increase the common mode current injected into the telephone, the lower impedance of the 'by-pass' path through auxiliary capacitors 41 and 43 serves to direct the common mode RF current around the printed circuit board 31, rather than through an 'undesired' path that includes the active circuitry on the printed circuit board 31. The values of auxiliary capacitors 41 and 43 must be sufficiently small to prevent reduction of the AC impedance that the telephone presents to the telephone network, when it is off hook.

As a non-limiting example it has been found that each of auxiliary capacitors 41 and 43 may have a value on the order of 0.02 uf or less. As noted earlier, when looking into the telephone circuit across the tip and ring leads 21 and 22, auxiliary capacitors 41 and 43 are in series with each other and establish a capacitance on the order of 0.01 uf across the tip and ring conductors 21 and 22. This resulting AC impedance is in parallel with the AC impedance of the telephone set. Capacitor values significantly larger than 0.02 uf may reduce the AC impedance of the telephone set to below the required 600 to 900 ohm range (which must be maintained over the 300 to 3400 Hz speech band). If the values of auxiliary capacitors 41 and 43 are larger than 0.02 uf, the level of demodulated audio can be further reduced; however, doing so would compromise the effective AC impedance.

The effect of inductors 51 and 53 is to present a high series impedance to the RF noise signals and thereby further reduce the injection of RF current into the telephone's active circuits, so that the level of the audio noise signal is below human audibility level. This effectively makes the performance of the telephone modified in accordance with the present invention virtually indistinguishable from a telephone connected to a transmission line in which no RF current is flowing.

As will be appreciated from the foregoing description, the auxiliary by-pass filtering mechanism of the present invention is operative to eliminate interference caused by high level, amplitude modulated, radio broadcasts, in particular, radio frequency interference (RFI) resulting from amplitude modulated RF noise currents conducted over the tip and ring leads of a telephone line-powered telephone instrument, so that the filtered telephone circuitry can perform its expected operations, without interference with conversation, and without degradation of conventional telephone performance parameters. What results is a telephone set that is virtually indistinguishable from one connected to transmission lines in which no RF current is flowing.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. An arrangement for suppressing interference caused by amplitude modulated radio frequency (RF) noise currents conducted over tip and ring leads to a telephone instrument, so that telephone circuitry of the telephone instrument can perform its expected operations without interference with conversation, and without degradation of telephone performance parameters, said arrangement comprising a conductive material supported within a housing of said telephone instrument, such that said conductive material surrounds said telephone circuitry of said telephone instrument, said conductive material being capacitively coupled to earth, and first and second capacitors coupled between said tip and ring leads and said conductive material.

2. An arrangement according to claim 1, wherein respective values of said first and second capacitors are larger than the value of mutual capacitance between conductors of said telephone circuitry and said conductive material, so that the effective impedance to earth seen by common mode RF noise current signals conducted on said tip and ring leads is lower than that encountered in a path through said telephone circuitry.

3. An arrangement according to claim 1, wherein respective values of said first and second capacitors are sufficiently small to prevent a significant reduction of the AC impedance that said telephone circuitry presents to a telephone network when said telephone instrument is off-hook.

4. An arrangement according to claim 1, wherein each of said first and second capacitors has a value on the order of 0.02 uf or less.

5. An arrangement according to claim 1, wherein said conductive material comprises a conductive coating formed on an interior surface of said housing of said telephone instrument.

6. An arrangement according to claim 5, further comprising first and second inductors coupled in series with said tip and ring leads and connections of said tip and ring leads to said telephone circuitry of said telephone instrument.

7. An arrangement according to claim 1, further comprising first and second inductors coupled between said tip and ring leads and said telephone circuitry of said telephone instrument.

8. An arrangement according to claim 7, wherein said first and second inductors have values on the order of 1 mH.

9. An arrangement according to claim 8, wherein each of said first and second capacitors has a value on the order of 0.02 uf or less.

10. An arrangement for suppressing interference caused by amplitude modulated radio frequency noise currents conducted over tip and ring leads to a telephone instrument, so that telephone circuitry of the telephone instrument can perform its expected operations without interference with conversation, and without degradation of telephone performance parameters, said arrangement comprising a conductive material supported within a housing of said telephone instrument, such that said conductive material surrounds said telephone circuitry of said telephone instrument, said conductive material being capacitively coupled to earth, and first and second inductors coupled between said tip and ring leads and said telephone circuitry.

11. A method for suppressing interference in the operation of telephone circuitry of a telephone instrument caused by radio frequency (RF) noise currents, conducted over tip and ring leads to said telephone instrument, as a result of AM broadcast signals from an AM radio source in the vicinity of said telephone instrument, said method comprising the steps of:

(a) surrounding said telephone circuitry of said telephone instrument with a conductive material which is capacitively coupled to earth; and (b) coupling first and second capacitors between said tip and ring leads and said conductive material.

12. A method according to claim 11, wherein respective values of said first and second capacitors are larger than the value of mutual capacitance between conductors of said telephone circuitry and said conductive material, so that the effective impedance to earth seen by common mode RF noise current signals conducted on said tip and ring leads is lower than that encountered in a path through said telephone circuitry.

13. A method according to claim 11, wherein respective values said first and second capacitors are sufficiently small to prevent a significant reduction of the AC impedance that said telephone circuitry presents to a telephone network when said telephone instrument is off-hook.

14. A method according to claim 11, wherein each of said first and second capacitors has a value on the order of 0.02 uf or less.

15. A method according to claim 11, wherein step (a) comprises forming said conductive material as a conductive coating on an interior surface of a housing of said telephone instrument.

16. A method according to claim 15, further comprising the step (c) of installing first and second inductors between said tip and ring leads and said telephone circuitry of said telephone instrument.

17. A method according to claim 11, further comprising the step (c) of installing first and second inductors between said tip and ring leads and said telephone circuitry of said telephone instrument.

18. A method according to claim 17, wherein said first and second inductors have values on the order of 1 mH.

19. A method according to claim 18, wherein each of said first and second capacitors has a value on the order of 0.02 uf or less.

* * * * *